United States Patent [19]
Krisle

[11] Patent Number: 4,899,934
[45] Date of Patent: Feb. 13, 1990

[54] IRRIGATION MONITOR

[76] Inventor: Kenneth R. Krisle, HCR 82, Box 69, Lemmon, S. Dak. 57638

[21] Appl. No.: 273,926

[22] Filed: Nov. 21, 1988

[51] Int. Cl.⁴ .............................................. A01G 25/09
[52] U.S. Cl. ......................................... 239/1; 239/69; 239/73; 239/728; 239/731
[58] Field of Search ............... 239/731, 733, 722, 728, 239/69, 73, 1

[56] References Cited

U.S. PATENT DOCUMENTS

| | | | |
|---|---|---|---|
| 3,613,703 | 10/1971 | Stout | 239/733 |
| 3,952,769 | 4/1976 | Ott | 239/731 |
| 4,073,309 | 2/1978 | Fraser et al. | 239/731 |
| 4,146,049 | 3/1979 | Kruse | 239/72 X |
| 4,760,547 | 7/1988 | Duxbury | 239/69 X |

FOREIGN PATENT DOCUMENTS 923469 4/1982 U.S.S.R. ............................. 239/733

Primary Examiner—Andres Kashnikow
Attorney, Agent, or Firm—Paul H. Gallagher

[57] ABSTRACT

In an irrigation rig made up of sections arranged end-to-end in a line, adjacent sections form angles therebetween, and in so doing form angles therebetween in the transverse movement of the rig. Safety switches are provided between adjacent sections, and when the angle becomes too large, the safety switches are actuated. The present device includes, in one form of the device, a signal transmitter controlled by a battery charged by the circuit driving the rig, and in a second form, a transformer energized by that circuit.

5 Claims, 1 Drawing Sheet

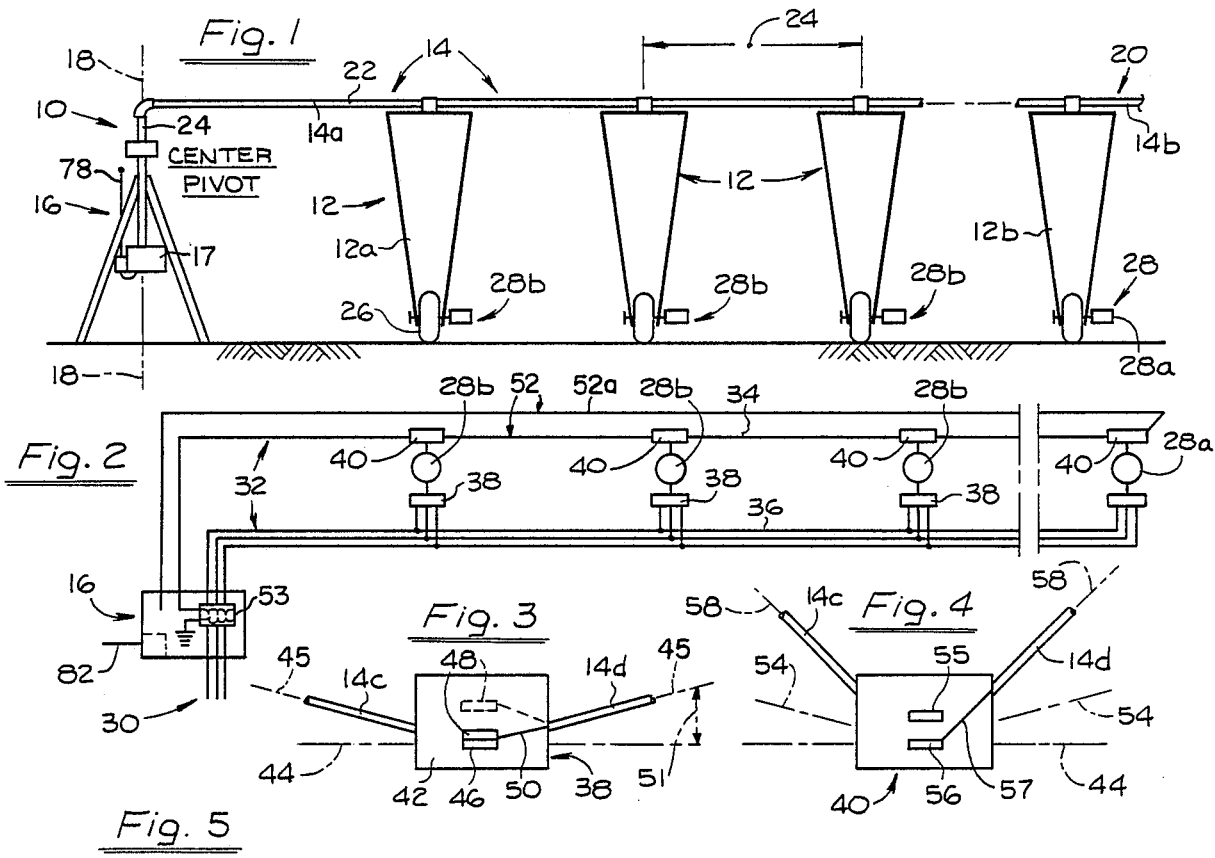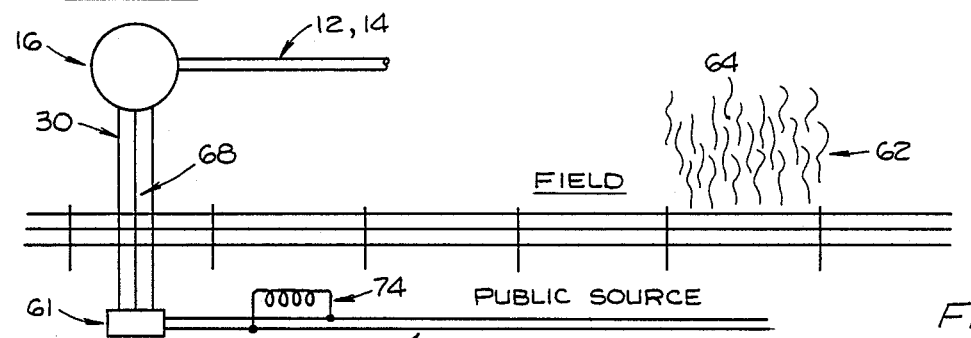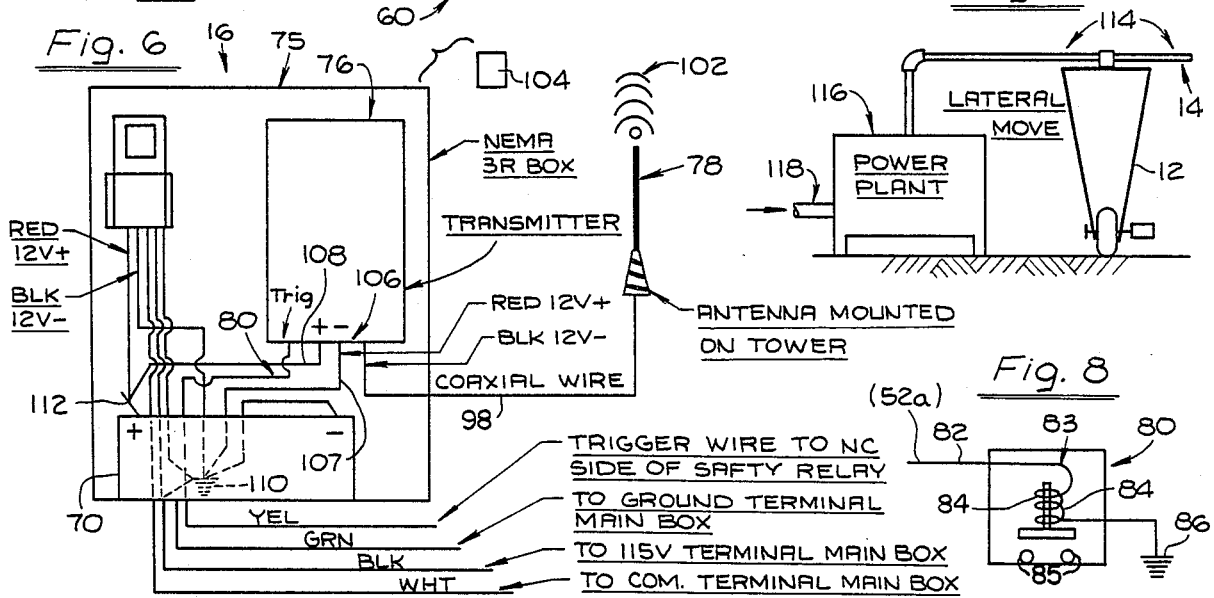

IRRIGATION MONITOR

FIELD OF THE INVENTION

The invention resides in the field of irrigation. Irrigation apparatuses or rigs are set to operate on automatic programs. In such programs, interacting controls are provided to stop the rig if all the functioning steps are not operating properly. However there have not been completely satisfactory devices for monitoring the stoppage of the rigs. Such irrigation apparatuses include rigs of both center pivot, and lateral move, types.

OBJECTS OF THE INVENTION

A main object of the invention is to provide a device for monitoring the movements of irrigation apparatus, and in the case of stoppage of the apparatus, to send signals of the stoppage, to a distance.

Another object is to provide such a device that can be applied to the irrigation apparatus, substantially without altering the apparatus.

Still another object is to provide such a device that is applicable to irrigation apparatus of both of the types mentioned above, namely, center pivot and lateral move.

DESCRIPTION OF A PREFERRED EMBODIMENT

In the drawings,

FIG. 1 is a diagrammatic side view of irrigation apparatus of the center pivot type.

FIG. 2 is a diagram of the electrical circuit utilized in the apparatus of FIG. 1.

FIG. 3 is a diagrammatic representation of a control switch used in the circuit of FIG. 2.

FIG. 4 is a diagrammatic representation of a safety switch used in the circuit of FIG. 2.

FIG. 5 is a diagram of a fragment of the circuit utilized in FIG. 2 with components incorporated in the present invention, incorporated therein.

FIG. 6 is a diagrammatic view of a radio signal transmitter, and related elements, to be incorporated in the circuit of FIG. 2.

FIG. 7 is a fragmentary diagrammatic representation correponding to the left end of FIG. 1, but incorporating a lateral move apparatus.

FIG. 8 is a diagram of a component of the circuit of FIG. 2.

Referring to the invention in general, in irrigation apparatus, as is generally known, a rig is made up of a number of sections jointed together and arranged in a line. The rig moves in a direction generally transverse to that line, both in the case of a center pivot and lateral move rig, and in so moving the sections do not form a straight line, but they form angular positions as between adjacent sections, and the angles therebetween vary as the rig moves. At the joints between the sections are towers, each tower supporting corresponding ends of the two adjacent sections, and each tower includes an independent motor or drive unit, and one of those drive units, at the end of the line, is an independent or master drive unit, while the remaining ones are slave units. The arrangement is such that the separate sections of the rig are moved by the drive units, and as one section is moved, it is so moved at one end, and when the section adjoining the other end is stationary, the moving section moves up to a position at an angle to the adjoining section, as indicated above, and this angular relationship is utilized in controlling the slave drive units. The rig includes control switches that are actuated by the adjacent sections when they assume a certain angle to each other, and the rig also includes safety switches which are also actuated by the adjacent sections when they are at a certain angle to each other, but in the latter case, at an angle greater than that in which the control switches are actuated. The foregoing features are normally contained in an irrigation rig or apparatus, and those features and relationships are utilized in the operation of the device of the present invention.

Referring in detail to the drawings, attention is directed first to FIG. 1 which shows the irrigation rig or apparatus in its entirety at 10. The rig includes a plurality of towers 12 and spans 14 between the towers. The rig shown in FIG. 1 is what is known as a center pivot type, and includes a pivot tower 16 in which is incorporated a main control panel or unit 17. The rig rotates about a vertical axis 18 extending through the pivot tower, and the pivot tower forming an inner end of the rig. the outer end being indicated generally at 20. The spans 14 include structural elements, and pipes 22 through which the water is pumped, from a vertical pipe section 24. The power unit 16 includes a pump (not shown) for so pumping the water. The rig is made up of a plurality of sections, each including a span 14 and the adjacent supporting towers 12, these section being indicated at 24. In certain cases, a span includes a portion of one or more towers. The rig also includes an inner span 14a between the innermost tower 12a supported by that tower and the vertical pipe section 24, and an outermost span 14b supported solely by the outermost tower 12b.

Each tower includes wheels 26 and each includes an individual drive motor or drive unit 28 driving the corresponding tower. The motor 28 on the outermost tower 12b is individually identified as 28a and may be referred to as a master drive motor. The remaining motors 28 on the towers are slave motors and are driven as referred to hereinbelow.

The drive circuit is indicated at 30 (FIGS. 2 and 5), preferably a 3-phase circuit, continuing to a sub-circuit 32 driving the motors 28. The latter circuit connects all of the motors 28, in parallel. The outermost motor 28a or master drive motor, is provided with a timer for adjusting the drive speed of that motor according to a predetermined program, such as 50% of the time, 40%, etc.

Associated with each of the slave motors 28b is a control switch 38 and a safety switch 40. The control switches 38 are connected in series with the corresponding slave motors 28b, and in each case the control switch and slave motor are connected in parallel across the lines.

FIG. 3 shows diagrammatically a form of the control switch 38 in the rig. The switch 38 itself includes a body 42 mounted on the corresponding tower 12, or a span of the rig, and positioned relative to a line or axis 44 representing a reference position of elements 14c, 14d, of adjacent sections or spans of the rig. The switch structure 38 includes a fixed contact 46, and a movable contact 48 mounted on an element or arm 50 which is a part of, or extends from, one of the spans, in this case 14d.

When the sections 14c, 14d, are in the reference position referred to, i.e. as indicated by the dot-dash line 44, the movable contact 48 is in its dot-dash line position, and the switch means is open. This breaks the circuit to the corresponding drive motor 28b, and that motor and the tower are stationary. The outermost or mastor motor 28a moves, or continues to move, according to the timer means built therein, and when it so moves, and the next tower inwardly therefrom remains stationary, an angle 51 develops between the two adjacent sections, at that tower, as indicated by the dot-dash lines 41, 45, and consequently the switch means 38 is closed, by the angular relationship between the two sections. This then starts the related slave motor, until that tower moves up the required amount, so as to be in the "line" of the rig, as indicated by the dot-dash line 44, and at this time, the switch means again opens and that tower stops.

An identical or similar relationship occurs between the adjacent sections at each of the towers.

The foregoing operation of the apparatus, including the functioning of the control switch 38 is provided in the usual driving means of the apparatus. The apparatus also includes means for assuring continued normal operation of the apparatus, but stopping it when any of various abnormal conditions exist. This is done by means of another sub-circuit 52 which includes the safety switches 40. Such a safety switch 40 is provided in each tower, and they are arranged in series in a line 52a in the circuit. In the occurrence of an abnormal condition, in any of the towers, the safety switch is actuated, in this case opened, to interrupt the circuit to the driving means, doing so by controlling the motor control relay 53. The abnormal conditions may be any of a wide variety, and regardless what the nature of those abnormal conditions is, upon actuation of any safety switch, the rig stops and the control apparatus of the present invention is actuated as described hereinbelow.

One of the abnormal conditions referred to may consist of one of the towers falling behind an abnormal amount. This may be caused by a muddy condition, in which the drive motor for that tower continues to operate, but the tower does not progress, and it falls farther behind the other towers, relative to the line of the rig as a whole. In such a case the related safety switch 40 is actuated. It will be understood that the tower that falls behind in this case, has fallen farther behind the position it would fall to in its normal operation for actuating the switch 38. Reference is made to FIG. 4, showing the switch 40. This figure includes the dot-dash line 44, which represents the reference line of the apparatus, and the dot-dash line 54 representing the line of the spans 14c, 14d, of FIG. 3 in which the switch 38 is actuated. The switch 40 includes a fixed contact 55, and a contact 56 mounted on an arm 57 forming an extension of one of the spans 14, e.g. 14d. The tower is in a further rearward position, as represented by the position of the spans 14c, 14d, their position being indicated by the dot-dash lines 58 which are at a greater angle relative to the reference line 44 than in FIG. 3. This opens the contacts 55, 56, and breaks the circuit in the line 52a (FIG. 2) and interrupts the main circuit 32.

The foregoing is included in the irrigating apparatus itself.

FIG. 5 is a fragmentary diagrammatic view of the left hand portion of the circuit of FIG. 2, together with other elements. The pivot tower 16 is shown, and the remainder of the rig is shown diagrammatically at 12, 14. A public source of electricity is indicated at 60, coming to a location 61 at the field to be irrigated, indicated at 62, which includes grass 64 or other plants. The public source 60 of electricity is usually 2-phase, and a unit 68, sometimes known as "Add-A-Phase" is incorporated to provide the 3-phase circuit 32 referred to.

The device of the present invention is applied to the apparatus described, and includes components mounted on the mechanical structure of the apparatus, preferably in the pivot tower 16. The device includes a battery 70, for example of 12 V capacity, and a battery charger 72.

FIG. 6 shows certain main components of the device. In this figure a unit 75 is shown, mounted on the unit 17, and on which is mounted a radio transmitter 76 having an antenna 78 (see also FIG. 1), and a terminal component 80 for triggering the transmitter. The transmitter 76 is of known kind, and while the functioning components thereof may be of various nature, one representative arrangement of triggering component 80 is shown in FIG. 8 which includes a lead-in conductor 82 leading from the drive conductor 52a (FIG. 2). This component includes a relay 83 which has a coil 84 and contacts 85, the conductor leading to ground at 86. The relay is normally open, but upon de-energization of the conductor 82, it is closed, and signals are transmitted through the conductor 98 (FIG. 6) to the antenna 78. The antenna transmits the signals, as indicated at 102, to the receiver 104, consisting of a detached signal receiver or beeper and carried by this operator and thus ambulatory.

The transmitter 76 is connected in the circuit of the apparatus by means of terminals 106 to one of which a conductor 107 is connected, leading to ground as indicated at 110. Leading from the other terminal 108 is another conductor 112 connected to the battery 70 for actually producing the signals in the transmitter 76. Thus, upon any of the safety switches 40 being opened, the monitoring signals are transmitted.

The device of the invention, in addition to use of the battery 70, includes, within the scope of the invention, an alternative arrangement utilizing a transformer for transmitting signals. The battery arrangement is preferred, since whenever the main source 60 to the apparatus is connected, the battery 70 becomes charged, and if the main source of electricity is interrupted, the battery becomes active, that is, the contacts 85 of the relay 83 (FIG. 8) are closed, completing circuit from the battery through the transmitter to ground.

In the alternative arrangement (FIG. 5) a transformer 74 is used of 115 V in, 12 V out, type in the 115 V receptacle in the NEMA 3R box 75 (FIG. 6), and when the circuit 32 is energized, the transformer retains the transmitter inactive, and upon breaking of the circuit, the transmitter becomes active and transmits the desired signals.

The control device of the invention may find most adaptability to center pivot rigs as noted, but the invention is sufficiently broad to cover lateral move rigs. Such a rig is represented in FIG. 7, where a lateral move rig is shown. The rig is indicated at 114, including towers 12 and spans 14, and a self-contained power plant 116. The power plant pumps water through an intake pipe 118 through the apparatus, and through a suitable control, driving the entire apparatus in lateral movement through the field. The apparatus is made up of a plurality of sections, jointed together and functioning in a manner similar to that described above in connection with the center pivot apparatus, and the control signals, indicating stoppage, are transmitted in a similar manner.

I claim:

1. Monitoring means for use in conjunction with irrigation apparatus having a plurality of jointed sections arranged in a line, and towers between adjacent sections supporting adjacent ends of the corresponding sections, individual electrical drive means in the towers for moving the towers, and thereby the sections, in direction generally transverse to said line, an electrical drive circuit operably connected to the drive means, and the drive means being operable for operation at individual speeds, and when operating at predetermined said speeds being operable for maintaining the sections in a line, and when any one of the drive means operates at a speed less than its own said predetermined speed, that drive means tends to produce an angular relation between the sections adjacent to that drive means, and the apparatus including switch means at individual towers operable by the corresponding adjacent sections moving into a predetermined angle therebetween, the monitoring means comprising, a signal transmitter operably connected in said circuit, and operable for transmitting signals to a distance, a battery charged by the drive circuit, and control means responsive to the drive circuit and operable thereby for maintaining the signal transmitter inactive when the drive circuit is energized and for connecting the battery with the signal transmitter for energizing the latter, when the drive circuit is de-energized.

2. Monitoring means according to claim 1 wherein, the transmitter includes a normally closed circuit for transmitting signals and means for holding the transmitter circuit open in response to energization of the drive circuit.

3. Monitoring means for use in conjunction with irrigation apparatus having a plurality of jointed sections arranged in a line, and towers between adjacent sections supporting adjacent ends of the corresponding sections, individual electrical drive means in the towers for moving the towers, and thereby the sections, in direction generally transverse to said line, an electrical drive circuit operably connected to the drive means, and the drive means being operable for operation at individual speeds, and when operating at predetermined said speeds being operable for maintaining the sections in a line, and when any one of the drive means operates at a speed less than its own said predetermined speed, that drive means tends to produce an angular relation between the sections adjacent to that drive means, and the apparatus including switch means at individual towers operable by the corresponding adjacent sections moving into a predetermined angle therebetween, the monitoring means comprising, a signal transmitter operably connected in said circuit, and operable for transmitting signals to a distance, a transformer energized by the electrical drive circuit, and operable when energized for maintaining the signal transmitter inactive.

4. A method of monitoring the operation of irrigation apparatus of the type that includes a plurality of sections arranged in a line forming junctures between adjacent sections and moving in a direction generally transverse to that line, and wherein in so moving, the sections form various angles therebetween, and further wherein an electrical circuit extends substantially the length of the apparatus and includes signal transmitting means and switch means at the junctures actuated by the sections forming said angles, including the steps, providing a battery in the signal transmitting means, prohibiting sending of signals, and charging the battery, when the circuit is energized, and transmitting signals to a distance by the use of the battery when the circuit is de-energized.

5. A method according to claim 4 and including the steps, providing a transformer and energizing it by the circuit, and controlling the transmitting of signals by the transformer in response to de-energization of the circuit.

* * * * *